United States Patent
Lingam et al.

(10) Patent No.: US 9,063,703 B2
(45) Date of Patent: Jun. 23, 2015

(54) TECHNIQUES FOR DYNAMIC VOICE MENUS

(75) Inventors: Jegan Lingam, Bellevue, WA (US); Uma Maheswari Anbazhagan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 27 days.

(21) Appl. No.: 13/328,130

(22) Filed: Dec. 16, 2011

(65) Prior Publication Data

US 2013/0156168 A1 Jun. 20, 2013

(51) Int. Cl.
- *H04M 11/00* (2006.01)
- *G06F 3/16* (2006.01)
- *H04M 3/493* (2006.01)
- *H04M 3/42* (2006.01)
- *H04M 1/725* (2006.01)
- *H04M 1/57* (2006.01)

(52) U.S. Cl.
CPC ............... *G06F 3/167* (2013.01); *H04M 3/493* (2013.01); *H04M 3/42059* (2013.01); *H04M 1/575* (2013.01); *H04M 1/72563* (2013.01); *H04M 1/72597* (2013.01)

(58) Field of Classification Search
CPC ...................................................... H04M 3/493
USPC ................................ 379/265.01–266.1, 88.16
See application file for complete search history.

(56) References Cited

U.S. PATENT DOCUMENTS

| | | | |
|---|---|---|---|
| 5,243,643 A * | 9/1993 | Sattar et al. | 379/88.23 |
| 6,061,433 A * | 5/2000 | Polcyn et al. | 379/93.12 |
| 6,314,402 B1 | 11/2001 | Monaco | |
| 7,065,188 B1 * | 6/2006 | Mei et al. | 379/88.23 |
| 7,065,201 B2 * | 6/2006 | Bushey et al. | 379/265.01 |
| 7,471,774 B2 * | 12/2008 | Patel et al. | 379/76 |
| 7,539,127 B1 * | 5/2009 | Shaffer et al. | 370/216 |
| 7,580,862 B1 * | 8/2009 | Montelo et al. | 705/26.1 |
| 7,664,233 B1 * | 2/2010 | Kirchmeier et al. | 379/37 |
| 7,844,045 B2 * | 11/2010 | Contolini et al. | 379/265.12 |
| 7,991,125 B2 | 8/2011 | Ryals et al. | |
| 8,437,466 B2 * | 5/2013 | Li et al. | 379/266.1 |

(Continued)

FOREIGN PATENT DOCUMENTS

| | | |
|---|---|---|
| EP | 1661308 B1 | 11/2010 |
| EP | 2317708 A2 | 5/2011 |
| KR | 100974696 B1 | 8/2010 |

OTHER PUBLICATIONS

Joe, Ryan, et al., "Selecting a Provider of Cloudbased Speech Self-Service Solutions in North America", OVUM, Jun. 2011, 63 pages.

(Continued)

*Primary Examiner* — Simon Sing
(74) *Attorney, Agent, or Firm* — Damon Reith; Peter Taylor; Micky Minhas

(57) ABSTRACT

Techniques for dynamic voice menus are described. An apparatus may comprise an endpoint component operative on a processor circuit to receive an incoming call from a user, and identify an incoming phone number for the incoming call, a menu retrieval component operative on the processor circuit to determine a voice menu based on the incoming phone number, and a menu performance component operative on the processor circuit to perform the voice menu for the user. Other embodiments are described and claimed.

20 Claims, 7 Drawing Sheets

(56) References Cited

U.S. PATENT DOCUMENTS

| | | | |
|---|---|---|---|
| 8,649,498 B1* | 2/2014 | Rankin et al. | 379/221.14 |
| 2003/0154403 A1* | 8/2003 | Keinsley et al. | 713/201 |
| 2004/0240640 A1 | 12/2004 | Warner et al. | |
| 2011/0066423 A1 | 3/2011 | Erhart et al. | |
| 2011/0069828 A1 | 3/2011 | Erhart et al. | |
| 2011/0078076 A1 | 3/2011 | Scipioni | |
| 2011/0096913 A1 | 4/2011 | Mahalingam | |
| 2011/0158392 A1 | 6/2011 | DeLuca et al. | |
| 2011/0276507 A1* | 11/2011 | O'Malley | 705/321 |

OTHER PUBLICATIONS

"Polycom and BroadSoft Help Service Providers Move from Hosted Voice to Cloud-Based Unified Communication Services", A Polycom Whitepaper, Dec. 2011, 5 pages.

"International Search Report", Mailed Date: Apr. 10, 2013, Application No. PCT/US2012/069969, Filed Date: Dec. 15, 2012, pp. 10.

* cited by examiner

TECHNIQUES FOR DYNAMIC VOICE MENUS

BACKGROUND

Voice menu systems can provide a phone-based method of interacting with a computer system. Conventional voice menu systems, in which all users receive the same static menu, have seen increasing use due to the increasing use of computer systems for performing administrative tasks and the increase quality of text-to-speech voice conversion. However, while static menus may be sufficient for situations in which calling users can be expected to conform to a common set of desired functions, they can be difficult to make in a manner that supports a wide range of functionality. Further, making changes to a static voice menu may need custom coding, increasing the cost of making changes and reducing the practicality of offering customized voice menus to individual users. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for dynamic voice menus. Some embodiments are particularly directed to techniques dynamically-compiled user-customized voice menus. In one embodiment, for example, an apparatus may comprise an endpoint component operative to receive an incoming call from a user, the endpoint component operative to identify an incoming phone number for the incoming call, a menu retrieval component operative to determine a voice menu based on the incoming phone number, and a menu performance component operative to perform the voice menu for the user. In some embodiments, the menu retrieval component may be operative to identify a custom voice menu specific to the user and load the custom voice menu. In some embodiments, loading the custom voice menu may comprise retrieving a custom voice script specific to the user and compiling the custom voice script in response to the received incoming call to produce the custom voice menu. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
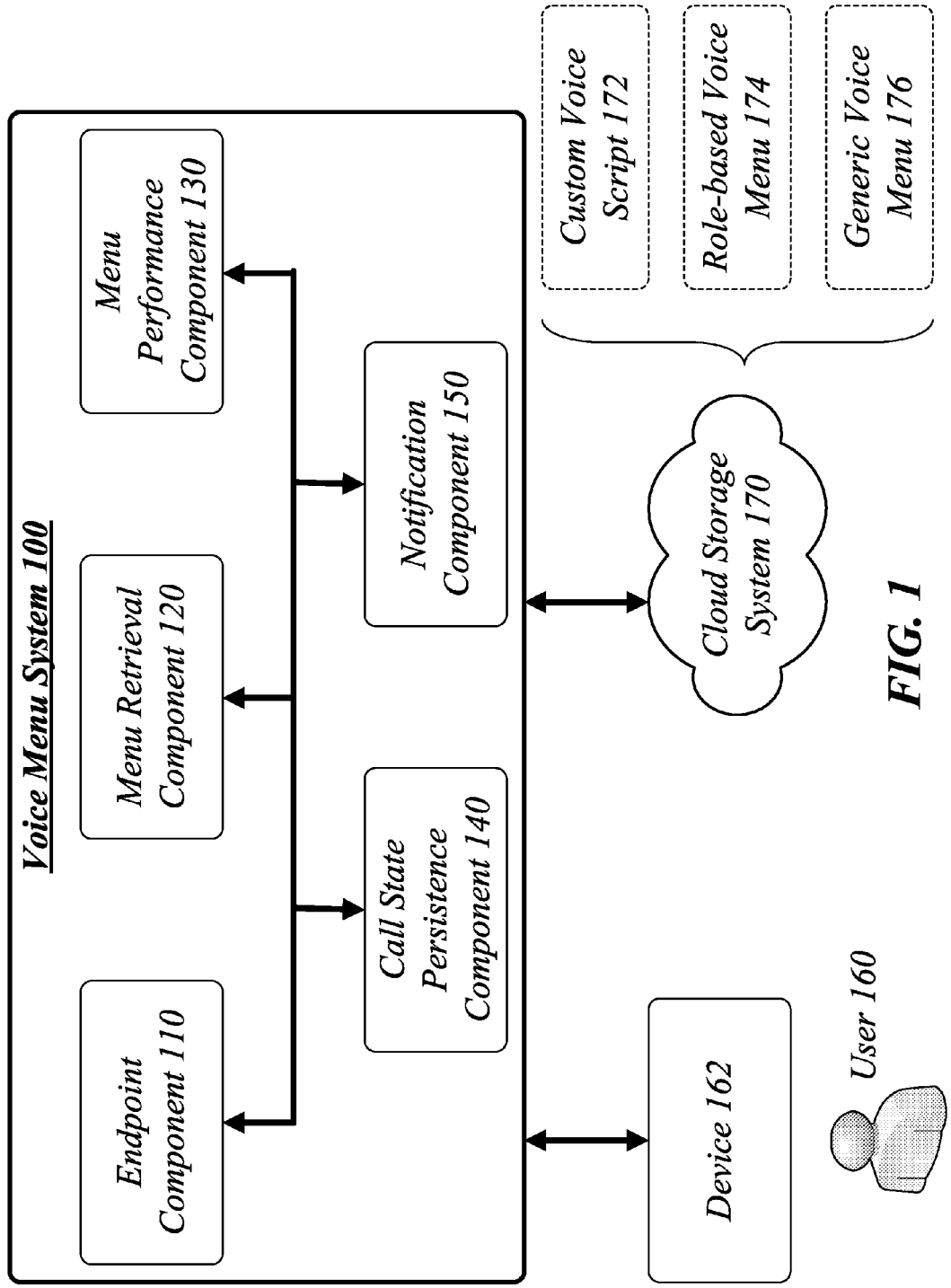
FIG. 1 illustrates an embodiment of a voice menu system.

Various embodiments are directed to techniques for dynamic voice menus. Traditional voice-menu services, or interactive voice response (IVR) systems, typically need customized hardware running pre-compiled, static voice menus. To the extent that traditional voice-menu services are able to provide interactions specific to a user, it typically results from a general voice-menu script being able to perform certain data-retrieval tasks—such as looking up billing information—on the basis of user-provided information such as a personal information number (PIN) entered through dual-tone multi-frequency signaling (DTMF) or other touch-tone data entry technique. Traditional voice-menu systems fail to offer users the ability to receive not only customized information, but customized logics flows.

In contrast, various embodiments may allow for users to make use of custom voice menus generated from a custom voice script. The custom voice menu and script may both be specific to the user, such that the menu and script are only used for that specific user. Further, the custom voice scripts may have been created by the user, such as by using a drag-and-drop user interface in which customizable voice script components can be linked together to create a custom voice script. For example, a user may decide that they wish for their custom voice menu to have a specific menu option which, when selected, results in the voice menu system providing to them, such as through text-to-speech (TTS) conversion, the most recent order date for their largest customers. This would empower the user to quickly determine whether any large customer has failed to make a recent renewal order and is therefore due for a phone call to ask whether any resupply is necessary. In some instances, the user may decide to include a second menu option for directly initiating a call to whichever large customer has gone the longest without contact, either a received order or a call from the user. It will be appreciated that if the voice menu system has access to the data from a customer relationship management (CRM) system, storing customer and business information, that voice menu options of considerable complexity may be built which allow for users to perform complex, customized tasks specific to their needs.

In some embodiments, this custom voice script may be compiled only at the time it is needed. A voice menu system may be tasked with manage custom voice scripts for a large number of users. As changes are made to various systems to which the scripts might be linked—such data repositories, CRM systems, or telephone networking bridging devices—pre-compiled scripts might require recompilation in order to function, requiring a recompile for every script for every user. Further, some voice menu systems might make use of a plurality of computing devices to handle the process of receiving or making calls and performing voice menus. In some environments, these computing devices might be heterogeneous, such as where different systems are used to handle plain old telephone system (POTS) and Voice over Internet Protocol (VOIP) based phone calls. On-demand compiling allows for each type of system to compile the custom voice script to a custom voice menu linked to the proper libraries for that system.

In some embodiments, the system may be operative to persist a user state in a voice menu in case of disconnection, such that a second, post-disconnection call may resume user interactions in the voice menu. A voice menu is a back-and-forth interaction between the voice menu system and a user based on a defined flow of logic. A user can be said to have a certain state while using a voice menu, this state being composed of their position within the defined logic flow and the value of any information retrieved or received by the voice menu system which may still affect the user's path through the voice-menu system. For example, a user may initiate a call to a voice menu system and receive a prompt to "Dial 1 to receive billing information" and "Dial 2 to receive shipping status information." A user which enters "2" and progresses through the logic flow to various options related to billing information, who is then disconnected (e.g. from a lost cell phone signal), may reconnect to the system and resume their place at the billing information options without having to re-enter previous information, such as they wish to continue in Spanish.

As discussed above, in some embodiments a plurality of computing devices may be used to handle the process of receiving or making calls and performing voice menus. As such, in some embodiments the persisted state for a disconnected call may be stored in a location accessible from all of the plurality of computing devices, such as by using a cloud storage solution. This may empower any device of the plurality of computing devices to handle a second incoming call from the disconnected user and resume that user's position in the flow of logic for the voice menu by retrieving the stored state from the common storage.

In some embodiments, multiple forms of user interaction with the voice menu system may be supported. For example, users may be able to enter information over the phone using either DTMF data entry or by speaking. As such, in some embodiments, the voice menu system may be operative to perform speech-to-text (STT) conversion as part of performing a voice menu. Alternatively or additionally, the voice menu system may be operative to recognize certain phrases as part of performing a voice menu, such as where a voice menu specifies that certain phrases are matches with certain menu options. Continuing with the previous example, a user might indicate that they wish to proceed in English by saying "English" and might indicate that they wish to proceed in Spanish by saying "Español." It will be appreciated that in the specific instance of which language is used, that the voice menu system may be operative to function in a wide variety of languages, and that a desired language may be associated with a user profile such that the preferred language is used in preference over a default language for the system or installation when receiving or initiating calls with that user.

In some embodiments, users may be allowed to set custom triggers which will cause the voice menu system to initiate a telephone call from the voice menu system to the user. For example, a user may create a custom notification requesting that whenever a client enters a product order above a certain quantity that they receive a phone call from the voice menu system to notify them of this order. This may aid employees responsible for maintaining the supply of products in responding quickly to situations which may require their attention. In general, a user may be able to create custom notifications regarding any element of a business or organization accessible by the voice menu system, such as any data managed by a customer relationship management (CRM) system. This access to the data managed by a CRM system may be performed in a modular manner, in which a variety of supported CRM systems may be used by loading a module corresponding to a particular system when needed for an installation.

In some embodiments, the voice menu system may be operative to plug in or connect to a wide variety of data services. For example, the voice menu system may be operative to connect to a web search service. In the instances where a web search system is connected, the voice menu system may be operative to provide access for users to the web search service. For example, a voice menu might have a selectable option to initiate a web search, wherein the voice menu system is operative to record a user's speech and convert the speech to text, the web search performed on the converted text. The voice menu system may be operative to return the result of the web search using a text-to-speech conversion, and may be operative to process the results of the web search to produce answers to spoken questions using any one of a number of known techniques for using web searches—or other Internet-based data searches—to answer questions. In some embodiments, the voice menu system may be operative to offer this functionality as part of its custom voice script creation process, wherein a pre-built web search element may be placed into the user's custom voice menu without the need for the user to perform programming.

It will be appreciated that the above possible embodiments and advantages may be used in a variety of combinations, wherein they can considerably expand both the variety of function and customizability of a voice menu system. As a result, the embodiments can improve the utility, affordability, scalability, modularity, extendibility, and interoperability of a voice menu system for the operator or user.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a voice menu system 100. In one embodiment, the voice menu system 100 may comprise a computer-implemented voice menu system 100 having one or more software applications and/or components. Although the voice menu system 100 shown in FIG. 1 has a limited number of elements in a certain topology, it may be appreciated that the voice menu system 100 may include more or less elements in alternate topologies as desired for a given implementation.

As shown in the illustrated embodiment of FIG. 1, the voice menu system 100 includes an endpoint component 110, a menu retrieval component 120, a menu performance component 130, a call state persistence component 140, and a notification component 150. The endpoint component 110 may be generally operative to receive an incoming call from a user 160, the endpoint component 110 operative to identify an incoming phone number for the incoming call. The menu retrieval component 120 may be generally operative to determine a voice menu based on the incoming phone number. The menu performance component 130 may be generally operative to perform the voice menu for the user 160. The call state persistence component 140 may be generally operative to persist a user state in the performed voice menu. The notification component 150 may be generally operative to initiate an outgoing call from the voice menu system 100 to a device 162 of a user 160 for communication of a notification, the outgoing call using a voice menu based on the contacted user and the notification.

In some embodiments, the voice menu system 100 may be communicatively connected to a cloud storage system 170. The cloud storage system 170 may be built on any one of a number of known technologies for implementing a cloud storage system. In general, the cloud storage system 170 may be generally operative to receive and store information on behalf of the voice menu system 100. In various embodiments, the cloud storage system may be operative to store custom voice scripts, role-based voice menus, and generic voice menus.

In general, the endpoint component 110 may be operative to receive an incoming call from a device 162 of a user 160. The device 162 may comprise any electronic device capable of initiating and accepting voice calls, such as a call terminal or user equipment (UE). The endpoint component 110 may identify an incoming phone number for the incoming call. In various embodiments, the incoming call can be received in a variety of manners. In some embodiments, the endpoint component 110 may be communicatively connected to a computer-accessible private branch exchange (PBX) system supporting traditional telephone calls. In some embodiments, the endpoint component 110 may be communicatively connected to a Session Initiation Protocol (SIP) system supporting voice-over-IP (VOIP) calls, which may itself support bridging from the traditional telephone network. In some embodiments, the endpoint component 110 may be communicatively connected to a plurality of devices empowering the reception and sending of phone calls. In general, the endpoint component 110 may be generally operative to receive an incoming call through any mechanism which can be used to receive a phone call. In various embodiments, the endpoint component 110 may be operative to use a modular system in which plugins for supporting different telephone technologies may be used to customize what telephone technologies are supported by the voice menu system 100. The endpoint component 110 may be operative to determine the incoming phone number using the appropriate technique corresponding to the telephone technology used by the voice menu system 100, such as the caller identification (CID) technology supported by traditional analog and digital phone systems and many VoIP systems.

In various embodiments, the endpoint component 110 may be operative to generate an outgoing call to a device 162 of a user 160 using a pre-set phone-number associated with the user 160. In general, the endpoint component 110 may be operative to generate and perform the outgoing call to the user 160 using any mechanism which may be used to generate and perform a phone call. This may use any of the technologies discussed above in regards to receiving incoming phone calls. In various embodiments, the endpoint component 110 may be operative to manage a queue of outgoing phone calls. This queue of outgoing phone calls may be particularly advantageous in systems with a limited ability to produce outgoing phone calls—such as where the number of outgoing phone lines is limited—and where the number of outgoing phone calls requested by the voice menu system 100 may exceed the number of outgoing phone lines. In general, the endpoint component 110 may be operative to receive a request to initiate an outgoing phone call and place the phone call request on the outgoing phone call queue. The endpoint component 110 may be operative to, when resources allow, take the next outgoing phone call request from the outgoing phone call queue and initiate the outgoing phone call.

The menu retrieval component 120 may be operative to determine a voice menu based on the identified incoming phone number. In some instances, the identified voice menu may comprise a custom voice menu specific to the user 160. In some instances, the identified voice menu may comprise a role-based voice menu 174 for a role associated with the user 160. In some instances, the identified voice menu may comprise a generic voice menu 176.

The menu retrieval component 120 may be operative to identify a custom voice menu specific to the user 160 and load the custom voice menu, wherein loading the custom voice menu comprises retrieving a custom voice script 172 specific to the user 160 and compiling the custom voice script 172 in response to the received incoming call to produce the custom voice menu. The custom voice script may be stored in an intermediate format, such as in a markup language such as extensible markup language (XML), which is not supported by the system for immediate use in performing a voice menu. That is to say, the custom voice script may be stored in an intermediate format which the system requires to be compiled before the script can be used. In these instances, the menu retrieval component 120 may be operative to compile the script in response to the need for the script. Compiling the script may include such operations as linking the compiled voice menu to various information or control systems, such as a CRM system, which will be used in performing the voice menu.

In some instance, the custom voice script 172 may have been previously created using input from the user 160. In some embodiments, the creation of a custom voice script may be accomplished without programming, using a drag-and-drop interface. Drag-and-drop interface elements may be linked together to provide for a flow of both logic and information. The logic flow may use any conventional technique for logic flows including, without limitation: elements which receive user input and convert it to a form usable by the voice menu system 100; elements which access data repositories, such as CRMs, and retrieve information in a form usably by the voice menu system 100; branching points which branch based on user input, such as a pressed button resulting in a DTMF tone; branching points which branch based on information retrieved from a data repository; branching points which branch based on a comparison between two or more pieces of information, such as between pieces of retrieved information or between retrieved information and user-entered information; elements which store data in a data repository, such as a CRM; and elements which provide data to the user, such as by reading it with a text-to-voice component. In various embodiments, custom voice menu scripts may be created both for incoming calls received from the user 160 and for outgoing notifications, allowing, for example, custom voice menus which provide multiple options for responding to a notification received from the voice menu system 100.

In general, the menu performance component 130 may be operative to perform the voice menu for the user 160. Performing the voice menu may comprise executing a compiled voice menu, which may comprise a pre-compiled generic voice menu, a pre-compiled role-based voice menu, or a custom voice menu compiled on-demand from a custom voice script specific to a user 160. Performing the voice menu may comprise retrieving, storing, or modifying data stored in a data repository such as a CRM system. Performing the voice menu may comprise performing a text-to-speech conversion on pre-written text and dynamically-retrieved data. In various embodiments, the text-to-speech conversion may be to a spoken human language, such as the English language or the Spanish language, wherein the spoken human language used is based on a spoken human language stored in a profile associated with the user 160.

In general, the call state persistence component 140 may be operative to persist a user state in the performed voice menu. Persisting a user state may comprise persisting such information as a position in flow of the logic of a voice menu, data entered by the user during the course of the voice menu, and data retrieved by the voice menu system 100 (e.g., such as from a CRM). The call state persistence component 140 may be operative to resume a user state in a performed voice menu on the basis of the persisted user state. For example, if a user connection to the voice menu system 100 and begins navigation of a voice menu, but is then unexpectedly disconnected, the call state persistence component 140 would be operative to place the user 160 back in their prior position in the navigation of the voice menu without the user needing to retrace their steps. In some embodiments, this resumption may be automatic upon the user reconnecting. In other embodiments, this resumption may be an option presented to the user 160 upon the user reconnection to the voice menu system 100, wherein they are given the option to their start over—in which case the persisted user state would be deleted—or resuming their state. This may be accomplished, for example, by initiating a resumption-specific script, shared by some or all users, in the event of a user 160 reconnecting after a disconnection, wherein either selected option—resuming or not—results in the menu performance component 130 performing the voice menu—such as a user-specific custom voice menu—either at the start or in the middle of navigation. In various embodiments, the user's state may be persisted in the cloud storage system 170.

The notification component 150 may be operative to initiate an outgoing call from the voice menu system 100 to the device 162 of the user 160 for communication of a notification, the outgoing call using a voice menu based on one or more of the contacted user, the notification, or the activated trigger. A notification may comprise a notification that a custom trigger—such as a custom trigger created by the user 160—has been activated, this notification comprising one or more pieces of data associated with the custom trigger. A custom trigger may be based upon any piece of information available to the voice menu system 100, including any information stored in a CRM system. For example, a custom trigger might specify that if some event is recorded in a CRM system—an order, receipt of a bill, receipt of a payment, or any other business or organizational action—that a notification of that event would be communicated by the voice menu system 100 to the associated user 160. In various embodiments, a data repository, such as a CRM system, may be responsible for activating triggers in the result the specified event occurs, wherein the data repository transmits a notification to the notification component 150. In other embodiments, the notification component 150 may be operative to periodically poll a data repository to determine whether a relevant event has occurred.

In general, custom triggers will cause the voice menu system 100 to initiate a telephone call from the voice menu system 100 to the user 160. For example, a user 160 may create a custom notification requesting that whenever any customer enters a product order above a certain quantity that they receive a phone call from the voice menu system 100 to notify them of this order. This may aid employees responsible for maintaining the supply of products in responding quickly to situations which may require their attention.

A user 160 may be able to create custom notifications regarding any element of a business or organization accessible by the voice menu system 100, such as any data managed by a CRM system. A custom notification may have associated with it a custom voice menu, the custom voice menu communicating one or more piece of data relevant to the notification and including menu options for responding to the notification.

The process of initiating an outgoing phone-call may be two-part. In the first part, the notification component 150 may place the notification—either received or generated by itself—onto an outgoing phone call queue, wherein the notification contains information to identify the activated trigger and thereby identify the relevant outgoing phone number and voice menu. In the second part, a calling component, such as the endpoint component 110, may periodically remove notifications from the outgoing phone call queue, attempt to contact the relevant user 160 via the device 162, and perform the voice menu associated with the notification. The endpoint component 110 may be operative to take pending notifications and initiate outgoing phone calls to the degree that it possesses processing and communications resources to do so.

In some embodiments, the notification component 150 may be operative to queue a failed outgoing call—a call in which the user 160 does not answer their phone or otherwise cannot be reached—onto a queue of failed calls for eventual re-try. The voice menu system 100 may be operative to periodically—such as on predefined or per-user time increments—re-try failed outgoing calls. In some embodiments, the notification component 150 may be operative to leave a voice mail or answering machine message for a user indicating some portion of the notification.

In some embodiments, the voice menu system 100 may be operative to alternative or additionally offer notifications through non-telephonic means. For instance, the voice menu system 100 may be operative to contact user 160 using various messaging applications, such as sending a text message using a short message service (SMS), multimedia messaging service (MMS), instant message (IM), e-mail, push notification to a desktop or mobile application, or any other communications modality for contacting the user 160. In general, the voice menu system 100 may support one or more defined methods of contact and may support loading modules which provide for additional methods of contact. The voice menu system 100 may be generally operative to store, associated with a trigger or user profile, one or more contact mechanisms for a user 160, and to store one or more preferences for which contact mechanism is desired or allowed, both between and as compared to using a telephone call. Similarly, the profile or trigger may have associated with it a plurality of telephone numbers for a user 160, with preferences stored indicating which contact mechanism is preferred. A user 160 may have associated with their profile one or more date-and-time based rules for specifying a preferred form of contact.

In some instances, multiple methods of contacting a user at a particular phone number may be possible. For example, a user 160 with a session initiation protocol (SIP) based VoIP phone number might be contacted either with an Internet connection to the SIP provider for the phone number or by dialing the phone number using the POTS network, wherein the SIP provider would bridge between the POTS network and their VoIP network. The endpoint component 110 may be operative to select a technique for contacting the user 160 based on one or more criteria, such as attempting to maximize voice quality, attempting to minimize cost, attempting to minimize local processing resources, or based on the availability of local communications resources, such as whether additional outgoing POTS connections are available.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 2:
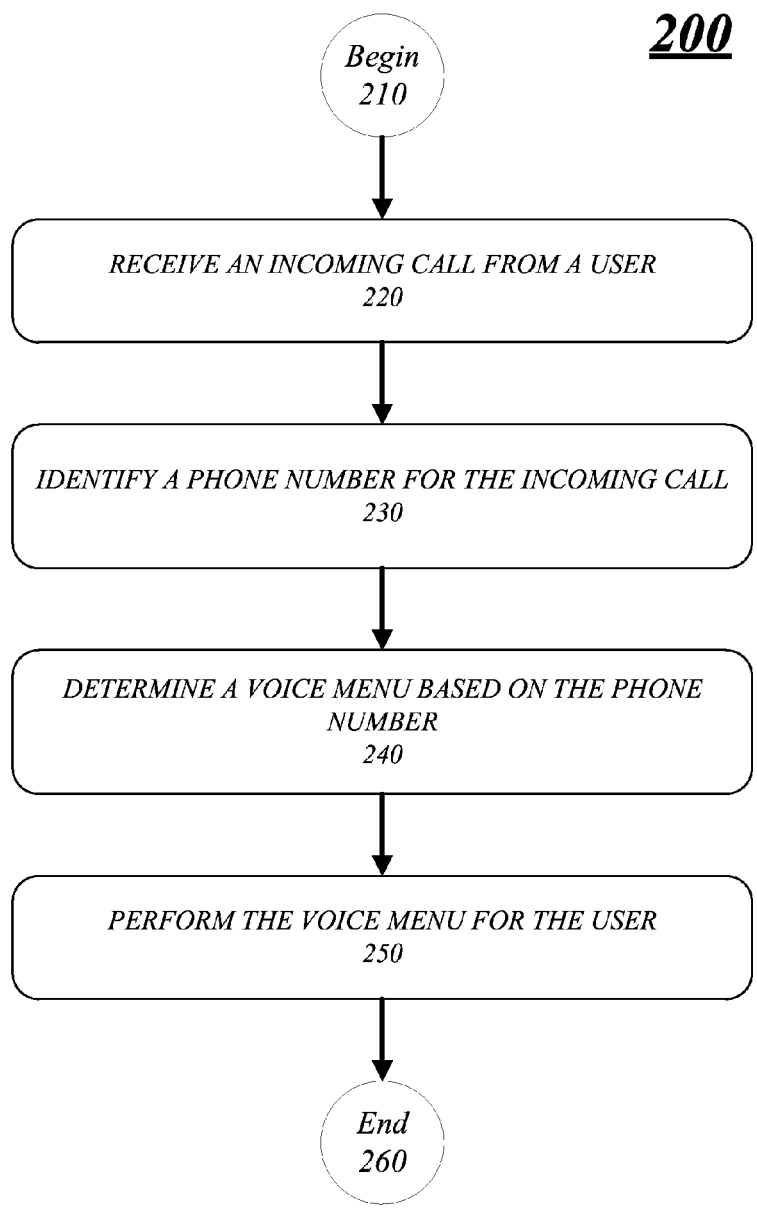
FIG. 2 illustrates an embodiment of a first logic flow for the voice menu system of FIG. 1.

FIG. 2 illustrates one embodiment of a first logic flow 200. The first logic flow 200 may be representative of some or all of the operations executed by one or more embodiments described herein, such as the voice menu system 100, for example.

Operations for the first logic flow 200 are initiated at block 210.

In block 220, an incoming call is received from a user. For example, the user 160 may utilize the device 162 to initiate a call that is received by the endpoint component 110 of the voice menu system 100.

In block 230, an incoming phone number is identified for the incoming call. For example, the endpoint component 110 may be operative to determine the incoming phone number using the appropriate technique corresponding to the telephone technology used by the voice menu system 100, such as caller identification technology supported by traditional analog and digital phone systems and many VoIP systems.

In block 240, a voice menu is determined based on the incoming phone number. Determining a voice menu may comprise determining to use one of a custom voice menu specific to the user, a role-based voice menu for a role associated with the user, or a generic voice menu. All of these options may be considered, with the voice menu system 100 selecting a custom voice menu over a role-based voice menu or a generic menu, and selecting a role-based voice menu over a generic menu.

As such, the voice menu system may first determine whether a custom voice menu specific to the user is available, such as by performing a lookup—such as a table lookup—using the identified incoming phone number to determine whether the identified incoming phone number is associated with a particular custom voice menu or custom voice script. This may comprise an intermediate step in which a profile for the user is determined on the basis of the identified incoming phone number, wherein the profile may specify a custom voice menu or script and may specify a role for the user. If a custom voice menu is identified, the custom voice menu may be used as the voice menu for the incoming call. If a custom voice script is identified, the custom voice script may be compiled into a custom voice menu, this custom voice menu compiled on demand to be used as the voice menu for the incoming call.

If no custom voice menu or custom script is identified—such that no custom voice menu specific to the user is available—a role associated with the user may be determined, such as may be specified in a lookup table based on incoming phone number, or such as may be specified in a profile for the user, the profile determined based on the incoming phone number. A role may comprise any position within an organization or business which may be shared by multiple individuals—such that it is not user-specific—but which is more specific than would be appropriate for use as a general script for anyone who calls into the voice menu system. A role may be specific to the type of work performed, such as, without limitation, sales, support, administration, or development. A role may be specific to a degree of authority within the organization, such as distinguishing between interns, low-level permanent employees, and management. In general, a role-based voice menu may be created for any grouping of people within an organization such that the people within the group have sufficient overlap in voice menu system functions that they may be jointly served by a voice menu specific to that role. Role-based voice menus may provide particular benefits for members of an organization which have not yet defined a custom voice menu. For example, an employee may be assigned a role at the time they are hired, the role specifying a role-based voice menu for use for the employee, such that the employee immediately experiences a more specific voice menu than the generic voice menu, with the option to create a user-specific custom voice menu being available as the user gains experience and develops needs specific to them or to their approach to their job.

If no custom voice menu or script or role-based menu is identified, a generic voice menu may be loaded. A generic voice menu may comprise any default voice menu applied to those incoming users and phone numbers which do not have an associated custom voice menu or role-based voice menu.

It will appreciated that while the above embodiments are generally described in regards to members of the organization hosting the voice menu system, that custom voice menus and role-based voice menus may be used for individuals external to the organization. For example, phone numbers associated with customers of a business may be associated with a role-based voice menu specific to customers, so that regular customers do not need to specify that they are a customer at the time they call the system. A role-based customer voice menu may focus on options for ordering, contacting sales associates, or other customer-specific needs. Similarly, phone numbers associated with suppliers of a business may be associated with a role-based voice menu specific to suppliers. A role-based supplier voice menu may focus on options for billing inquiries, contacting buying associates, or other supplier-specific needs. Further, custom voice menus may be created for specific individual external to the organization, such as for particular customers or suppliers or for particular business contacts at a customer, supplier, or other external entity.

In block 250, the voice menu is performed for the user. As previously discussed, this may comprise the use of text-to-speech conversion, the reception of data input from a user, the gathering of data from data repositories such as a CRM system, or any other element of a logic flow.

Figure 3:
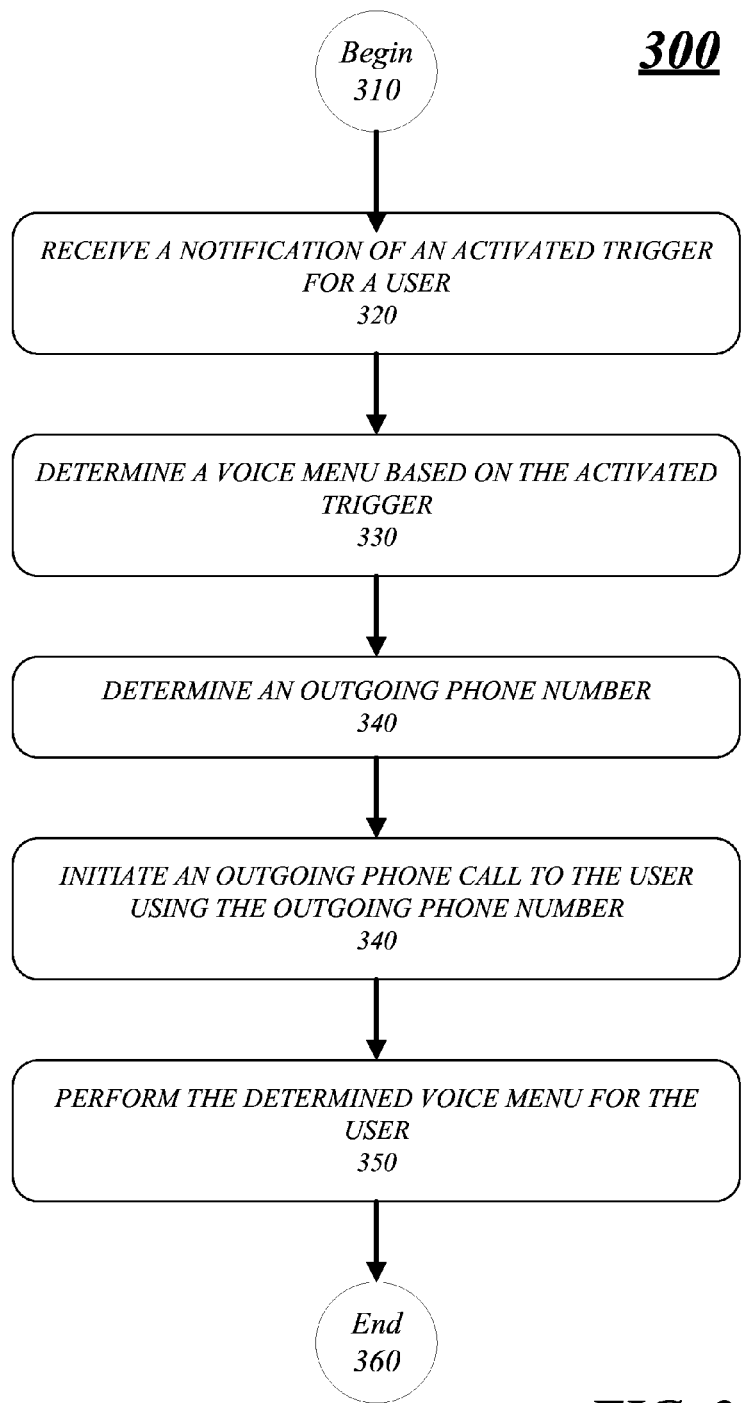
FIG. 3 illustrates an embodiment of a second logic flow for the voice menu system of FIG. 1.

FIG. 3 illustrates one embodiment of a second logic flow 300. The second logic flow 300 may be representative of some or all of the operations executed by one or more embodiments described herein.

Operations for the second logic flow 300 are initiated at block 310.

In block 320, a notification of an activated trigger for a user is received. This notification may be received from a system for managing data, such as a CRM system for managing customer data. The trigger may comprise any custom or standardized trigger appropriate to the system for managing data. The trigger may comprise a trigger for one or more users to be notified based on the occurrence of any event that may be monitored by the system for managing and monitoring data. A trigger may be specific to a particular user or may be shared by a group of users. In the circumstance that a trigger is shared by a group of users, the trigger may include rules for determining which user or users of the group of users should receive the notification. In some embodiments, the rules may include a ranked prioritization of one or more users of the group, such that an order is specified in which attempts to reach users should be made to communicate the notification, such that if one user is unable to be reached, the system attempts to contact the next user in the specified order. In some embodiments, the group of users may comprise a role, such that a profile associated with the role specifies rules for which one or more users fitting the role are to be notified, or an ordering of contacts for users fitting the role.

In block 330, a voice menu is determined based on the activated trigger. The voice menu may be a user-specific voice menu or a group or role-based voice menu. The voice menu may comprise notifying the contacted user or users of the occurrence of the activated trigger and, possibly, one or more options for responding to the notification. This user-specific voice menu or role-based voice menu may be specific to a particular trigger or may be shared by multiple triggers. For example, a trigger might specify that a developer is to be automatically contacted if a particular software development project has finished a test run, wherein the associated voice menu is specific to finished test runs for software, but contains switches or other configuration elements which allow the voice menu to dynamically adjust to which particular test run has finished, such as by taking a test-run identifier as an input which may be communicated to the contacted user.

In block 340, an outgoing phone number is determined. The outgoing phone number may be an explicitly-coded part of a trigger or voice menu associated with the trigger, may be derived based on a profile associated with a user specified by the trigger, or, as discussed above, may be derived based on a profile associated with a user indirectly determined from the trigger, such as where the trigger specifies a role to be contacted, wherein a profile associated with the role specifies one or more rules for selecting the user or users to be contacted.

In block 350, the determined voice menu is performed for the user. As previously discussed, this may comprise the use of text-to-speech conversion, the reception of data input from a user, the gathering of data from data repositories such as a CRM system, or any other element of a logic flow.

Figure 4:
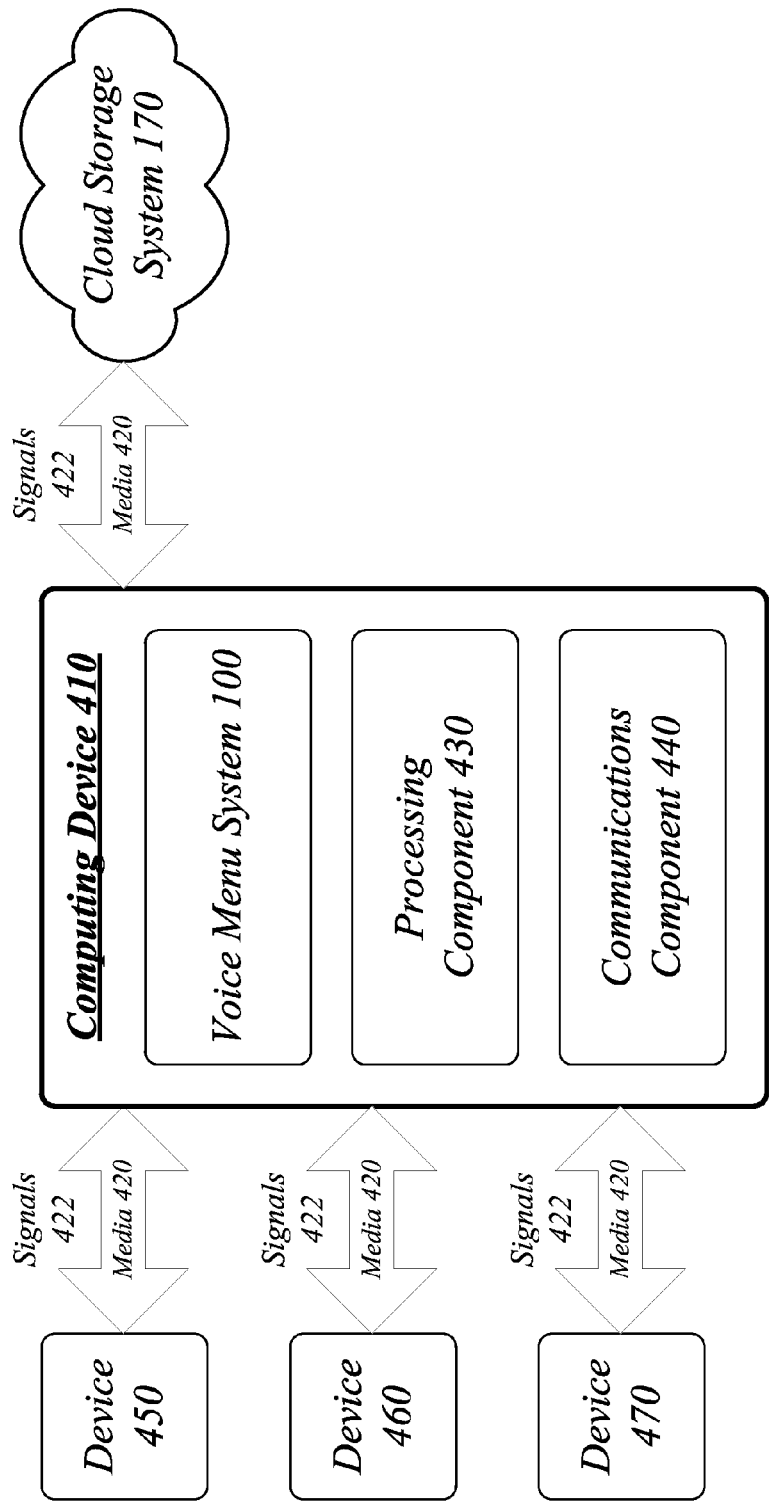
FIG. 4 illustrates an embodiment of a centralized system for the voice menu system of FIG. 1.

FIG. 4 illustrates a block diagram of a centralized system 400. The centralized system 400 may implement some or all of the structure and/or operations for the voice menu system 100 in a single computing entity, such as entirely within a single computing device 410.

The computing device 410 may execute processing operations or logic for the voice menu system 100 using a processing component 430. The processing component 430 may comprise various hardware elements, software elements, or a combination of both. Examples of hardware elements may include devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 410 may execute communications operations or logic for the voice menu system 100 using communications component 440. The communications component 440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 420 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 420.

The computing device 410 may communicate with other devices 450, 460, and 470 over a communications media 420 using communications signals 422 via the communications component 440. Similarly, the computing device may communicate with cloud storage system 170 over a communications media 420 using communications signals 422 via the communications component 440.

Device 450 may comprise a first user device for a user specifying a custom voice menu. The signals 422 sent over media 420 with regards to device 450, therefore, may comprise a network connection to the voice menu system 100 for the purposes of accessing an interface for specifying custom voice menus. In some embodiments, device 450 may use custom software—such as software specific to the voice menu system 100—for specifying a custom voice menu. In some embodiments, voice menu system 100 may provide—such as by using processing component 430 and communications component 440—a web-based software solution for specifying custom voice menus. In either case, the custom voice menu received by the voice menu system 100 may comprise a custom voice menu, specific to the user, created without the use of programming. Creating a custom voice menu without the use of programming may correspond to creating a custom voice menu using only drag-and-drop element placement, drag-and-drop linking between elements, and the entry of basic terms, such as numbers, identifiers, or names, which do not require the use of a specialized programming language. In general, creating a custom voice menu without the use of programming may comprise any process for creating a custom voice menu which does not depend on the user writing code in a programming language, such as C or JAVA, and does not depend on the user entering information in a schema intended for encoding documents in machine-readable form, such as XML.

Device 460 may comprise a second user device for a user initiating an incoming phone call to the voice menu system 100. The signals 422 sent over media 420 with regards to device 460, therefore, may comprise the initiation and performance of a voice menu for a user—such as a custom voice menu, a role-based voice menu, or a generic voice menu—in response to the reception of the incoming phone call by the voice menu system 100.

Device 470 may comprise a third user device receiving an outgoing phone call from the voice menu system 100. The signals 422 sent over media 420 with regards to device 470, therefore, may comprise the initiation and performance of a voice menu for a user—such as a custom voice menu or a role-based voice menu—in response to the reception of an activated trigger by the voice menu system 100 for a user.

In various embodiments, cloud storage system 170 may be responsible for storing, managing, and retrieving data for use by the computing device 410 in performing the functions of the voice menu system 100. Further, in various embodiments, the cloud storage system 170 may be responsible for recognizing events which correspond to a stored trigger and communicating the activation of a trigger to the voice menu system 100.

Figure 5:
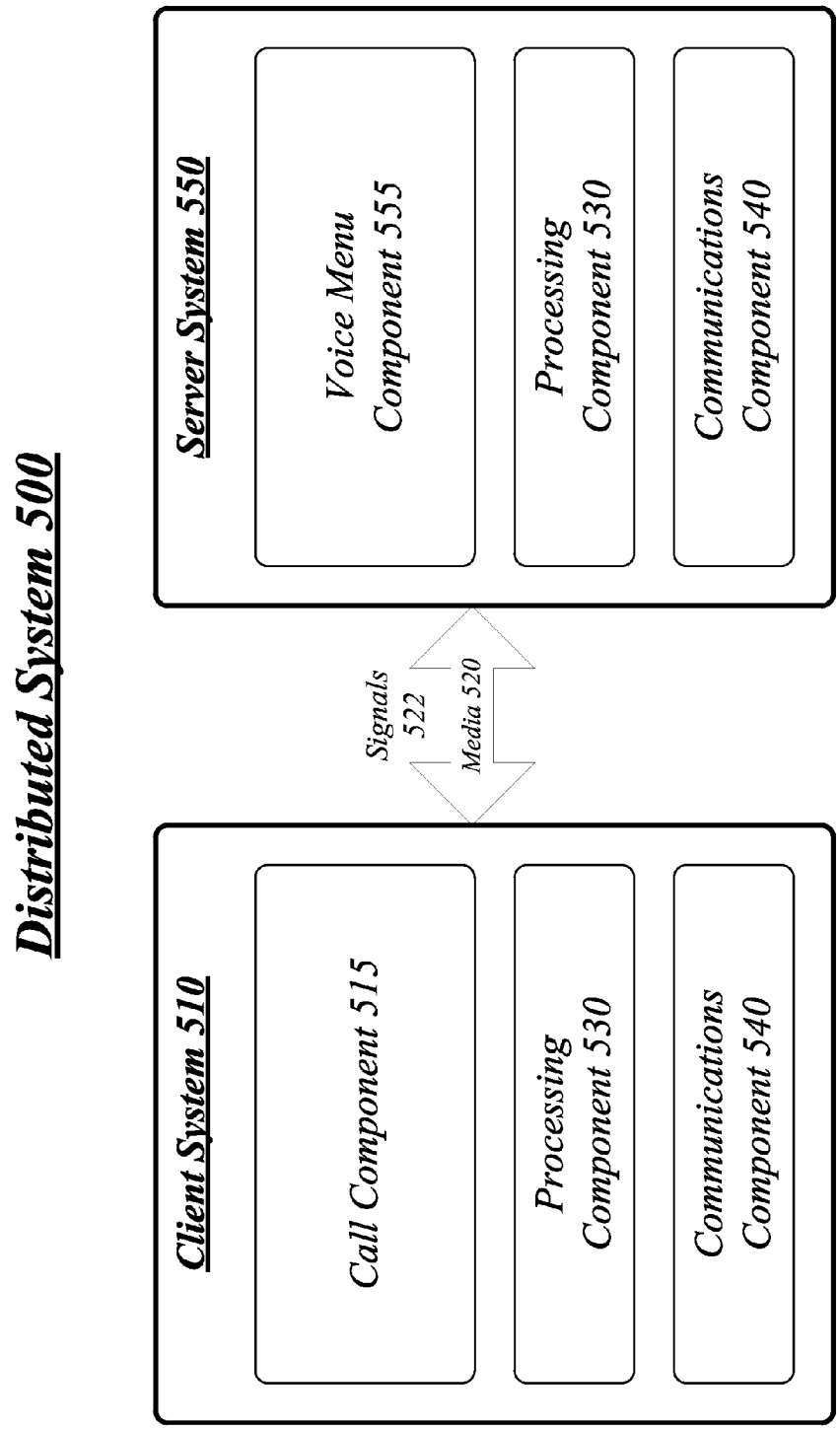
FIG. 5 illustrates an embodiment of a distributed system for the voice menu system of FIG. 1.

FIG. 5 illustrates a block diagram of a distributed system 500. The distributed system 500 may distribute portions of the structure and/or operations for the systems 100, 400 across multiple computing entities. Examples of distributed system 500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The client system 510 and the server system 550 may process information using the processing components 530, which are similar to the processing component 430 described with reference to FIG. 4. The client system 510 and the server system 550 may communicate with each over a communications media 520 using communications signals 522 via communications components 540, which are similar to the communications component 440 described with reference to FIG. 4.

In one embodiment, for example, the distributed system 500 may be implemented as a client-server system. A client system 510 may comprise a call component 515 that implements the endpoint component 110, menu performance component 130, call state persistence component 140, and notification component 150. In general, the client system 510 may comprise a system for initiating and receiving calls to and from users and for performing and managing the calls. A server system 550 may comprise a voice menu component 555 that implements the menu retrieval component 120 and some or all of the functions of the cloud storage system 170. It will be appreciated that other divisions of labor between the client system 510 and the server system 550 may be envisioned.

In various embodiments, the client system 510 may comprise or employ one or more client computing devices and/or client programs that operate to perform various methodologies in accordance with the described embodiments. For example, client system 510 may be one of a plurality of clients systems, each of which is operative to perform call duties for the distributed system 500 as directed by the server system 550. As previously discussed, the voice menu system 100 may queue outgoing phone calls in the event that insufficient resources are available to make all requested outgoing phone calls simultaneously. In some embodiments, a client system 510 may comprise a consumer of the outgoing phone call queue, such that a outgoing phone call on the outgoing phone call queue may be handled by one of a plurality of client systems.

In various embodiments where a plurality of client systems are used, the distributed system 500 may be operative to dynamically scale the number of client systems based on demand. In cases where more incoming calls requested or outgoing calls required, additional client systems may be allocated for use by the distributed system 500 so as to handle the additional volume. Where appropriate, such as in cases where client systems are leased, this scaling may be limited or modified by a specified business relationship. Similarly, this scaling may be recorded by the distributed system 500 for the purposes of billing or performance evaluation. Continuing, in cases where more client systems are allocated to the distributed system 500 than required, some portion of the client systems currently being used by the distributed system 500 may be deallocated, which may result, for example, in the deallocated systems being moved to a general pool or otherwise made available for other uses. The deallocation of a system may comprise an incremental process by which the client system to be deallocated takes no incoming calls and pulls no outgoing calls from the queue, handling any in-progress calls until such that they have concluded, at which time the client system could be fully deallocated. Alternatively, where possible, in-progress calls may be migrated from the client system to be deallocated to another, after which the client system could be deallocated.

In various embodiments, the server system 550 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 550 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

In various embodiments, the server system 550 may function to mediate between one or more client systems, such as client system 510, and one or more data repositories, such as a CRM system. Server system 550 may be implemented as a cloud computing system, in which a plurality of servers operate together to perform computing tasks. Server system 550 may be operative to store and manage user profiles, role-based profiles, user-specific custom voices scripts, user-specific custom voice menus, role-based voice menus, generic voice menus, persisted call state, pending notifications, activated triggers, un-activated triggers, and the data necessary to determine whether a trigger should be activated. It will be appreciated that by, for example, persisting call state in the server system 550, that an incoming phone call received from a user with persisted state may be handled by a different client system than the client system which handled the disconnected call, as the new client system can access the persisted state via the server system 550.

Figure 6:
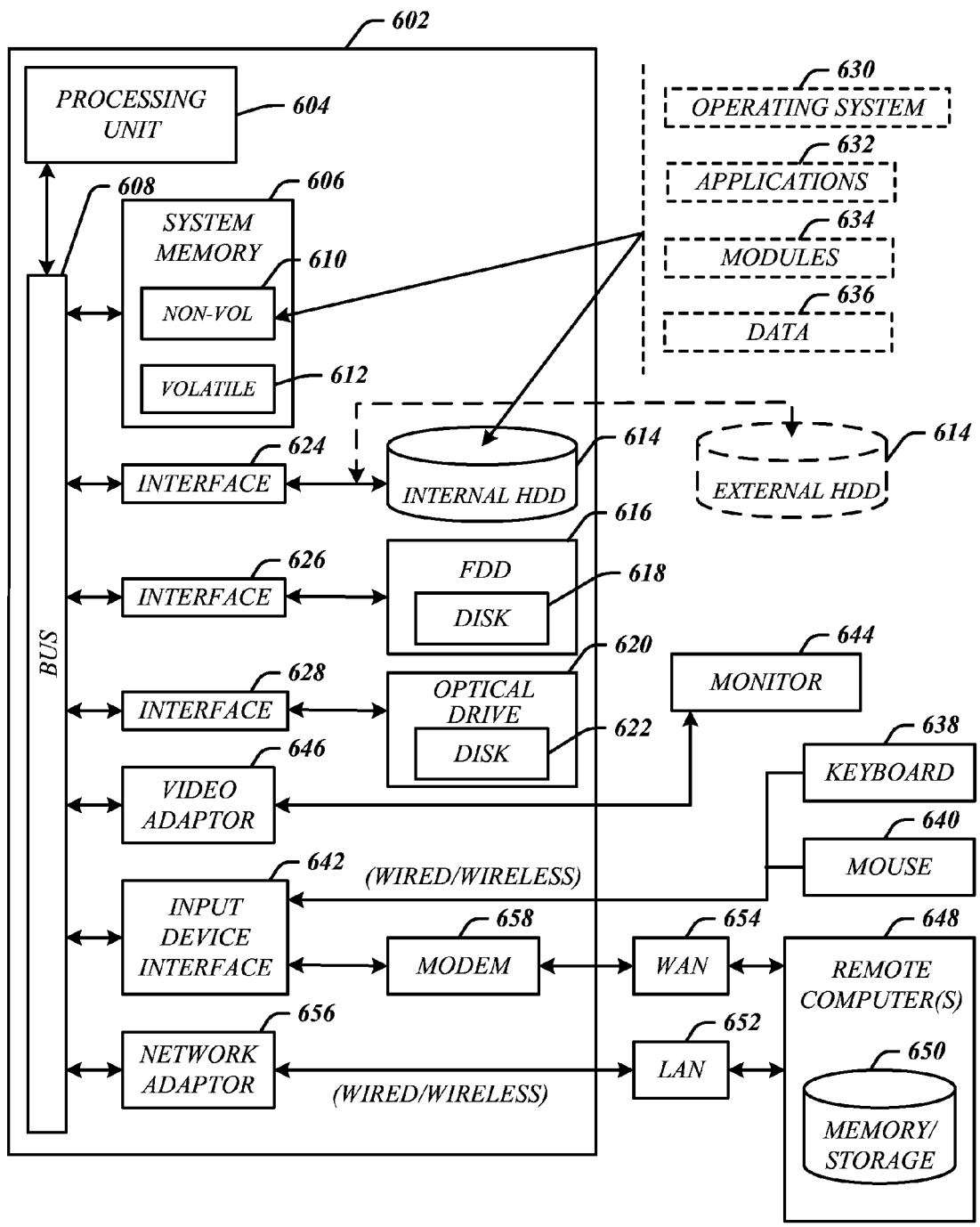
FIG. 6 illustrates an embodiment of a computing architecture.

FIG. 6 illustrates an embodiment of an exemplary computing architecture 600 suitable for implementing various embodiments as previously described, such as the device 162 and the various components of the voice menu system 100. As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 600 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors. Dual microprocessors and other multi-processor architectures may also be employed as the processing unit 604. The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636.

The one or more application programs 632, other program modules 634, and program data 636 can include, for example, the endpoint component 110, the menu retrieval component 120, the menu performance component 130, the call state persistence component 140, or the notification component 150.

A user can enter commands and information into the computer 602 through one or more wire/wireless input devices, for example, a keyboard 638 and a pointing device, such as a mouse 640. Other input devices may include a microphone, an infra-red (IR) remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
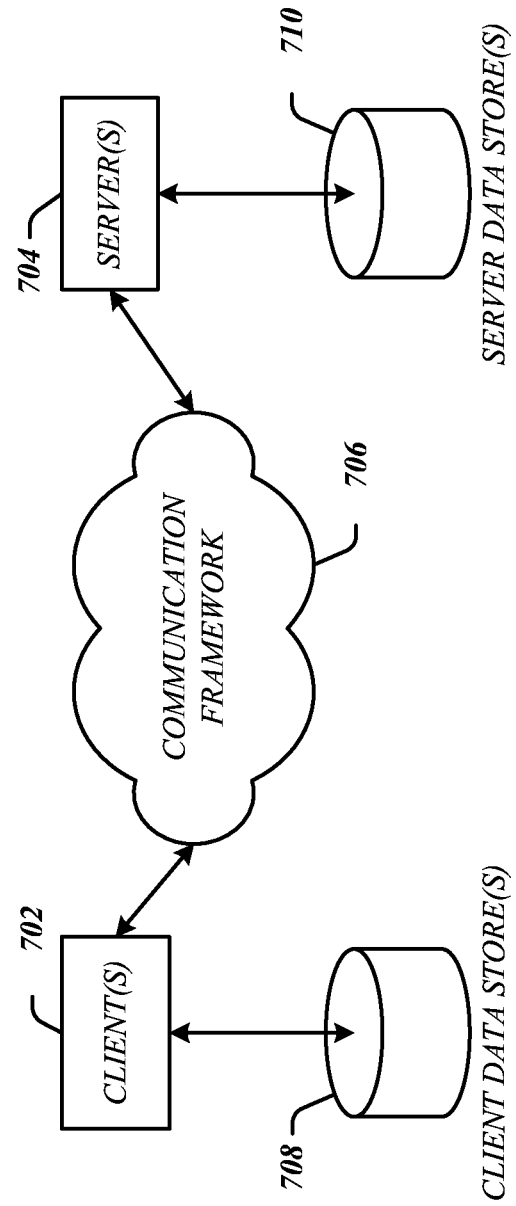
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, and so forth. The embodiments, however, are not limited to implementation by the communications architecture 700.

As shown in FIG. 7, the communications architecture 700 comprises includes one or more clients 702 and servers 704. The clients 702 may implement the client systems 310 or the devices 450, 460, and 470. The servers 704 may implement the server system 550. The clients 702 and the servers 704 are operatively connected to one or more respective client data stores 708 and server data stores 710 that can be employed to store information local to the respective clients 702 and servers 704, such as cookies and/or associated contextual information. In various embodiments, the client data stores 708 and/or the server data stores 710 may comprise cloud storage systems, such as cloud storage system 170.

The clients 702 and the servers 704 may communicate information between each other using a communication framework 706. The communications framework 706 may implement any well-known communications techniques and protocols, such as those described with reference to systems 400, 500 and 600. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a processor circuit;
   an endpoint component operative on the processor circuit to receive an incoming call from a user, and identify an incoming phone number for the incoming call;
   a menu retrieval component operative on the processor circuit to determine whether to perform a dynamically-compiled custom voice menu, a role-based voice menu, or a generic voice menu based on the incoming phone number;
   a menu performance component operative on the processor circuit to perform one of the voice menus for the user; and
   a call state persistence component operative to persist a user state in the performed voice menu.

2. The apparatus of claim 1, the menu retrieval component operative to identify the custom voice menu specific to the user and load the custom voice menu.

3. The apparatus of claim 1, the menu retrieval component operative to identify the custom voice menu specific to the user, and load the custom voice menu from a cloud storage system.

4. The apparatus of claim 1, the menu retrieval component operative to retrieve a custom voice script specific to the user, and compile the custom voice script in response to the received incoming call to produce the custom voice menu.

5. The apparatus of claim 4, wherein the custom voice script was previously created using input from the user.

6. The apparatus of claim 1, the menu retrieval component operative to identify that no custom voice menu specific to the user is available, identify the role-based voice menu for a role associated with the user, and load the role-based menu.

7. The apparatus of claim 1, the menu retrieval component operative to identify that no custom voice menu specific to the user is available, identify that no role-based voice menu for a role associated with the user is available, and load the generic voice menu.

8. The apparatus of claim 1, further comprising a notification component to initiate an outgoing phone call to the user for communication of a notification based at least partially on a custom trigger.

9. A computer-implemented method, comprising:
   receiving an incoming call from a user;
   identifying, by a processor circuit, a phone number for the incoming call;
   determining whether to perform a dynamically-compiled custom voice menu, a role-based voice menu, or a generic voice menu based on the phone number, the dynamically-compiled custom voice menu comprising elements selected by the user;
   performing one of the voice menus for the user; and
   persisting a user state in the performed voice menu.

10. The computer-implemented method of claim 9, comprising:
    identifying the custom voice menu specific to the user; and
    loading the custom voice menu.

11. The computer-implemented method of claim 10, comprising:
    retrieving a custom voice script specific to the user; and
    compiling the custom voice script in response to the incoming call to produce the custom voice menu, wherein the custom voice script was previously created using input from the user.

12. The computer-implemented method of claim 9, comprising:
    identifying that no custom voice menu specific to the user is available;
    identifying the role-based voice menu for a role associated with the user; and
    loading the role-based menu.

13. The computer-implemented method of claim 9, comprising:
    identifying that no custom voice menu specific to the user is available;
    identifying that no role-based voice menu for a role associated with the user is available; and
    loading the generic voice menu.

14. The computer-implemented method of claim 9, further comprising:
    receiving a notification of an activated custom trigger for the user;
    determining a voice menu based on the activated custom trigger; and
    determining an outgoing phone number associated with the user.

15. The computer-implemented method of claim 14, further comprising:
    initiating an outgoing phone call to the user using the outgoing phone number; and
    performing the determined voice menu for the user.

16. An article of manufacture comprising a storage medium containing instructions that when executed cause a system to:
    receive an incoming call from a user;
    identify an incoming phone number for the incoming call;
    determine whether to perform a dynamically-compiled custom voice menu created by the user, a role-based voice menu for a role associated with the user, or a generic voice menu based on the incoming phone number;
    perform one of the voice menus for the user; and
    persist a user state in the performed voice menu.

17. The article of claim 16, further comprising instructions that when executed cause the system to:
    identify the custom voice menu specific to the user; and
    load the custom voice menu.

18. The article of claim 17, further comprising instructions that when executed cause the system to:
    retrieve a custom voice script specific to the user; and
    compile the custom voice script in response to the received incoming call to produce the custom voice menu, wherein the custom voice script was previously created using input from the user.

19. The article of claim 16, further comprising instructions that when executed cause the system to:
    identify that no custom voice menu specific to the user is available;

identify the role-based voice menu for a role associated with the user; and
load the role-based menu.

20. The article of claim 16, further comprising instructions that when executed cause the system to:
identify that no custom voice menu specific to the user is available;
identify that no role-based voice menu for a role associated with the user is available; and
load the generic voice menu.

* * * * *